United States Patent
Chen et al.

(10) Patent No.: US 9,293,140 B2
(45) Date of Patent: Mar. 22, 2016

(54) SPEAKER-IDENTIFICATION-ASSISTED SPEECH PROCESSING SYSTEMS AND METHODS

(71) Applicant: Broadcom Corporation, Irvine, CA (US)

(72) Inventors: Juin-Hwey Chen, Irvine, CA (US); Robert W. Zopf, Rancho Santa Margarita, CA (US); Bengt J. Borgstrom, Santa Monica, CA (US); Elias Nemer, Irvine, CA (US); Ashutosh Pandey, Irvine, CA (US); Jes Thyssen, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 235 days.

(21) Appl. No.: 13/965,661

(22) Filed: Aug. 13, 2013

(65) Prior Publication Data

US 2014/0278417 A1    Sep. 18, 2014

Related U.S. Application Data

(60) Provisional application No. 61/837,020, filed on Jun. 19, 2013, provisional application No. 61/788,135, filed on Mar. 15, 2013.

(51) Int. Cl.
| | | |
|---|---|---|
| *G10L 15/00* | (2013.01) | |
| *G10L 17/00* | (2013.01) | |
| *G10L 17/06* | (2013.01) | |
| *G10L 21/00* | (2013.01) | |

(52) U.S. Cl.
CPC ............... *G10L 17/00* (2013.01); *G10L 17/06* (2013.01); *G10L 21/00* (2013.01)

(58) Field of Classification Search
CPC ......... G10L 17/00; G10L 17/22; G10L 21/02; G10L 21/0208; G10L 21/0272; G10L 21/028
USPC ................................ 704/226, 233, 246–250
See application file for complete search history.

(56) References Cited

U.S. PATENT DOCUMENTS

| | | | |
|---|---|---|---|
| 5,897,616 A * | 4/1999 | Kanevsky et al. | 704/246 |
| 6,205,424 B1 * | 3/2001 | Goldenthal et al. | 704/247 |
| 2003/0088414 A1 * | 5/2003 | Huang | G10L 17/04 704/246 |
| 2004/0138877 A1 * | 7/2004 | Ariu | 704/211 |
| 2005/0086056 A1 * | 4/2005 | Yoda et al. | 704/246 |
| 2006/0282264 A1 * | 12/2006 | Denny et al. | 704/233 |
| 2008/0195387 A1 * | 8/2008 | Zigel et al. | 704/236 |
| 2011/0300806 A1 * | 12/2011 | Lindahl et al. | 455/63.1 |

* cited by examiner

*Primary Examiner* — Shaun Roberts
(74) *Attorney, Agent, or Firm* — Fiala & Weaver P.L.L.C.

(57) ABSTRACT

Methods, systems, and apparatuses are described for performing speaker-identification-assisted speech processing. In accordance with certain embodiments, a communication device includes speaker identification (SID) logic that is configured to identify a user of the communication device and/or the identity of a far-end speaker participating in a voice call with a user of the communication device. Knowledge of the identity of the user and/or far-end speaker is then used to improve the performance of one or more speech processing algorithms implemented on the communication device.

20 Claims, 8 Drawing Sheets

SPEAKER-IDENTIFICATION-ASSISTED SPEECH PROCESSING SYSTEMS AND METHODS

CROSS REFERENCE TO RELATED APPLICATION

This application claims priority to U.S. Provisional Application Ser. No. 61/788,135, filed Mar. 15, 2013, and U.S. Provisional Application Ser. No. 61/837,020, filed Jun. 19, 2013, which are incorporated by reference herein in their entirety.

BACKGROUND

1. Technical Field

The subject matter described herein relates to speech processing algorithms that are used in digital communication systems, such as cellular communication systems.

2. Description of Related Art

A number of different speech processing algorithms are currently used in cellular communication systems. For example, conventional cellular telephones implement standard speech processing algorithms such as acoustic echo cancellation, multi-microphone noise reduction, single-channel noise suppression, packet loss concealment, and the like, to improve speech quality. Generally speaking, these algorithms typically all operate in a speaker-independent manner. That is to say, each of these algorithms is typically designed to perform in the same manner regardless of the identity of the speaker that is currently using the cellular telephone.

BRIEF SUMMARY

Methods, systems, and apparatuses are described for performing speaker-identification-assisted speech processing, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
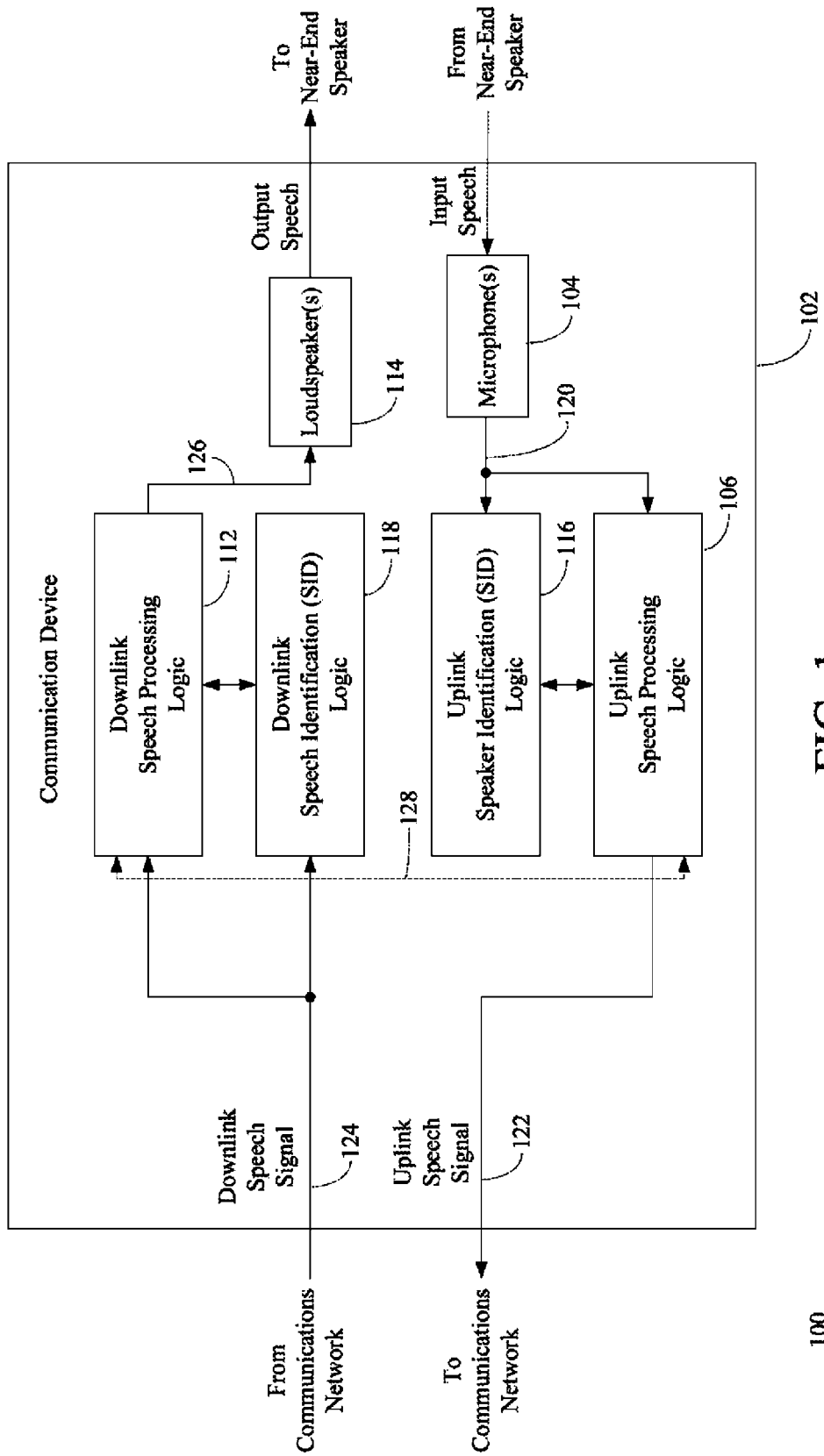
FIG. 1 is a block diagram of a communication device that implements speaker-identification-assisted speech processing techniques in accordance with an embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Almost all of the various speech processing algorithms used in communication systems today have the potential to perform significantly better if the algorithms could determine with a high degree of confidence at any given time whether the input speech signal is the speech signal uttered by a target speaker. Therefore, embodiments described herein use an automatic speaker identification (SID) algorithm to determine whether the input speech signal at any given time is uttered by a specific target speaker and then adapt various speech processing algorithms accordingly to take the maximum advantage of this information. By using this technique, the entire communication system can potentially achieve significantly better performance. For example, speech processing algorithms have the potential to perform significantly better if they know at any given time whether a current frame (or a current sub-band in a current frame) of a speech signal is predominantly the voice of a target talker.

In particular, a communication device is described herein. The communication device includes processing logic. The processing logic is configured to obtain a first speech signal, identify a first speaker associated with the first speech signal, and process at least a portion of the first speech signal in a manner that takes into account the identity of the first user. The processing logic is further configured to obtain a second speech signal, Identify a second speaker associated with the second speech signal, and process at least a portion of the second speech signal in a manner that takes into account the identity of the second speaker.

A method for performing speech processing in a communication device is also described herein. In accordance with the method, a speech signal is received during a communication session. A first speaker associated with the speech signal is identified. A first portion of the speech signal is processed in a manner that takes into account the identity of the first speaker. A second speaker associated with the speech signal is identified. A second portion of the speech signal is processed in a manner that takes into account the identity of the second speaker.

Another communication device is also described herein. The communication device includes speaker identification logic and speech processing logic. The speaker identification logic is configured to apply a speaker identification algorithm to a speech signal to generate speaker identification information. The speaker identification information includes at least an identifier that identifies a target speaker associated with the speech signal. The speech processing logic includes a plurality of speech signal processing stages. Each of the plurality of speech signal processing stages is configured to process the speech signal in accordance with a respective speech processing algorithm based on the speaker identification information provided by the speaker identification logic.

II. Example Systems and Methods for Speech Processing Based on the Identity of the Speaker(s)

FIG. 1 is a block diagram of a communication device 102 that is configured to perform speaker identification for one or more speakers during a communication session in accordance with an embodiment. As shown in FIG. 1, communication device 102 includes one or more microphones 104, uplink speech processing logic 106, downlink speech processing logic 112, one or more loudspeakers 114, uplink speaker identification (SID) logic 116 and downlink SID logic 118. Examples of communication device 102 may include, but are not limited to, a cell phone, a personal data assistant (PDA), a tablet computer, a laptop computer, a handheld computer, a desktop computer, a video game system, or any other suitable device capable of conducting a video call, an audio-only telephone call.

Microphone(s) 104 may be configured to capture input speech originating from a near-end speaker and to generate an input speech signal 120 based thereon. Uplink speech processing logic 106 may be configured to process input speech signal 120 in accordance with various uplink speech processing algorithms to produce an uplink speech signal 122. Examples of uplink speech processing algorithms include, but are not limited to, acoustic echo cancellation, residual echo suppression, single channel or multi-microphone noise suppression, voice activity detection, wind noise reduction, speech encoding, etc. Uplink speech signal 122 may be processed by one or more components that are configured to encode and/or convert uplink speech signal 122 into a form that is suitable for wireless transmission across a communication network. Uplink speech signal 122 may be received by devices or systems associated with far-end speaker(s) via the communication network. Examples of communication networks include, but are not limited to, networks based on Code Division Multiple Access (CDMA), Time Division Multiple Access (TDMA), Frequency Division Multiple Access (FDMA), Frequency Division Duplex (FDD), Global System for Mobile Communications (GSM), Wideband-CDMA (W-CDMA), Time Division Synchronous CDMA (TD-SCDMA), Long-Term Evolution (LTE), Time-Division Duplex LTE (TDD-LTE) system, and/or the like.

Communication device 102 may also be configured to receive a speech signal (e.g., downlink speech signal 124) from the communication network. Downlink speech signal 124 may originate from devices or systems associated with far-end speaker(s). Downlink speech signal 124 may be processed by one or more components that are configured to convert and/or decode downlink speech signal 124 into a form that is suitable for processing by communication device 102. Downlink speech processing logic 112 may be configured to process downlink speech signal 124 in accordance with various downlink speech processing algorithms to produce an output speech signal 126. Examples of downlink speech processing algorithms include, but are not limited to, joint source channel decoding, bit error concealment, speech decoding, packet loss concealment, speech intelligibility enhancement, acoustic shock protection, etc. Loudspeakers 114 may be configured to play back output speech signal 126 as output speech for near-end user(s).

In an embodiment, the various uplink and downlink speech processing algorithms may be performed in a manner that takes into account the identity of one or more near-end speakers and/or one or more far-end speakers participating in a communication session via communication device 102. This in contrast to conventional systems, where speech processing algorithms are performed in a speaker-independent manner.

In particular, uplink SID logic 116 may be configured to receive input speech signal 120 and perform SID operations based thereon to identify a near-end speaker associated with input speech signal 120. For example, uplink SID logic 116 may obtain a speaker model for the near-end speaker. In one embodiment, uplink SID logic 116 obtains a speaker model from a storage component of communication device 102 or from an entity on a communication network. In another embodiment, uplink SID logic 116 obtains the speaker model by analyzing one or more portions (e.g., one or more frames) of input speech signal 120. Once the speaker model is obtained, other portion(s) of input speech signal 120 (e.g., frame(s) received subsequent to obtaining the speaker model) are compared to the speaker model to generate a measure of confidence, which is indicative of the likelihood that the other portion(s) of input speech signal 120 are associated with the near-end speaker. Upon the measure of confidence exceeding a predefined threshold, a SID-assisted mode may be enabled for communication device 102 that causes the various uplink speech processing algorithms to operate in a manner that takes into account the identity of the near-end speaker.

Likewise, downlink SID logic 118 may be configured to receive downlink speech signal 124 and perform SID operations based thereon to identify a far-end speaker associated with downlink speech signal 124. For example, downlink SID logic 118 may obtain a speaker model for the far-end speaker. In one embodiment, downlink SID logic 118 obtains a speaker model from a storage component of communication device 102 or from an entity on a communication network. In another embodiment, downlink SID logic 118 obtains the speaker model by analyzing one or more portions (e.g., one or more frames) of downlink speech signal 124. Once the speaker model is obtained, other portion(s) of downlink speech signal 124 (e.g., frame(s) received subsequent to obtaining the speaker model) are compared to the speaker model to generate a measure of confidence, which is indicative of the likelihood that the other portion(s) of downlink speech signal 124 are associated with the far-end speaker. Upon the measure of confidence exceeding a predefined threshold, a SID-assisted mode may be enabled for communication device 102 that causes the various downlink speech processing algorithms to operate in a manner that takes into account the identity of the far-end speaker.

In an embodiment, such as the embodiment described below with reference to FIG. 3, a speaker may also be identified using biometric and/or facial recognition techniques performed by logic (not shown in FIG. 1) included in communication device 102 instead of by obtaining a speaker model in the manner previously described.

Each of the speech processing algorithms performed by communication device 102 can benefit from the use of the SID-assisted mode. Multiple speech processing algorithms can be controlled or assisted by the same SID module to achieve maximum efficiency in computational complexity. Uplink SID logic 116 may control or assist all speech processing algorithms performed by uplink speech processing logic 106 for the uplink signal (i.e., input speech signal 120), and downlink SID logic 118 may control or assist all speech processing algorithms performed by downlink speech processing logic 112 for the downlink signal (i.e., downlink speech signal 124). In the case of a speech processing algorithm that takes both the downlink signal and the uplink signal as inputs (such as an algorithm performed by an acoustic echo canceller (AEC)), both downlink SID logic 118 and uplink SID logic 116 can be used together to control or assist such a speech processing algorithm.

It is possible that information obtained by downlink speech processing logic 112 may be useful for performing uplink speech processing and, conversely, that information obtained by uplink speech processing logic 106 may be useful for performing downlink speech processing. Accordingly, in accordance with certain embodiments, such information may be shared between downlink speech processing logic 112 and uplink speech processing logic 106 to improve speech processing by both. This option is indicated by dashed line 128 coupling downlink speech processing logic 112 and uplink speech processing logic 106 in FIG. 1.

In certain embodiments, communication device 102 may be trained to be able to identify a single near-end user (e.g., the primary owner of communication device 102, as the primary owner will be using communication device 102 roughly 95 to 99% of the time). While doing so may result in improvements in speech processing the majority of the time, such an embodiment does not take into account the occasional use of communication device 102 by other users. For example, occasionally a family member or a friend of the primary user of communication device 102 may also use communication device 102. Moreover, such an embodiment does not take into account downlink speech signal 124 received by communication device 102 via the communication network, which keeps changing from communication session to communication session. Furthermore, the near-end speaker and/or the far-end speaker may even change during the same communication session in either the uplink or the downlink direction, as two or more people might use a respective communication device in a conference/speakerphone mode.

Accordingly, uplink SID logic 116 and downlink SID logic 118 may be configured to determine when another user begins talking during the communication session and operate the various speech processing algorithms in a manner that takes into account the identity of the other user.

Figure 2:
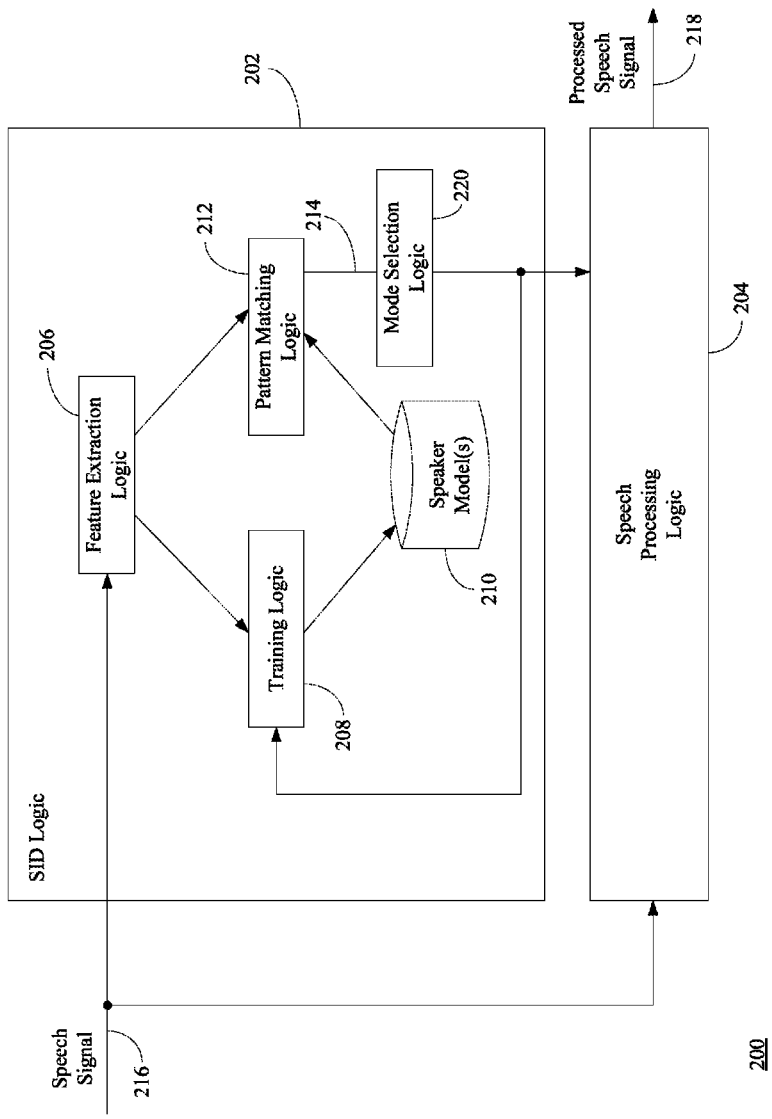
FIG. 2 is a block diagram of speaker identification logic in accordance with an embodiment.

FIG. 2 is a block diagram 200 of example SID logic 202 in accordance with such an embodiment. SID logic 202 may comprise an implementation of uplink SID logic 116 or downlink SID logic 118 as described above in reference to FIG. 1. For example, in an implementation in which SID logic 202 comprises an embodiment of uplink SID logic 116, speech signal 216 may correspond to input speech signal 120 and speech processing logic 204 may correspond to uplink speech processing logic 106. In an implementation in which SID logic 202 comprises an implementation of downlink SID logic 118, speech signal 218 may correspond to downlink speech signal 124 and speech processing logic 204 may correspond to downlink speech processing logic 112. As discussed above with reference to FIG. 1, SID logic 202 is configured to determine the identity of a user speaking during a communication session (e.g., either a near-end speaker or a far-end speaker).

As shown in FIG. 2, SID logic 202 includes feature extraction logic 206, training logic 208, one or more speaker models 210, pattern matching logic 212 and mode selection logic 220. Feature extraction logic 206 may be configured to continuously collect and analyze speech signal 216 to extract feature(s) therefrom during a communication session with another user. That is, feature extraction is done on an ongoing basis during a communication session rather than during a "training mode," in which a user speaks into communication device 102 outside of an actual communication session with another user.

One advantage to continuously collecting and analyzing speech signal 216 is that the SID operations are invisible and transparent to the user (i.e., a "blind training" process is performed on speech signal(s) received by communication device 102). Thus, user(s) are unaware that any SID operation is being performed, and the user of communication device 102 can receive the benefit of the SID operations automatically without having to explicitly "train" communication device 102 during a "training mode." Moreover, such a "training mode" is only useful for training near-end users, not far-end users, as it would be awkward to have to ask a far-end caller to train communication device 102 before starting a normal conversation in a phone call.

In an embodiment, feature extraction logic 206 extracts feature(s) from one or more portions (e.g., one or more frames) of speech signal 216, and maps each portion to a multidimensional feature space, thereby generating a feature vector for each portion. For speaker identification, features that exhibit high speaker discrimination power, high interspeaker variability, and low intraspeaker variability are desired. Examples of various features that feature extraction logic 206 may extract from speech signal 216 are described in Campbell, Jr., J., "Speaker Recognition: A Tutorial," Proceedings of the IEEE, Vol. 85, No. 9, September 1997, the entirety of which is incorporated by referenced herein. Such features may include, for example, reflection coefficients (RCs), log-area ratios (LARs), arcsin of RCs, line spectrum pair (LSP) frequencies, and the linear prediction (LP) ceptrsum.

In an embodiment, SID logic 202 may employ a voice activity detector (VAD) to distinguish between a speech signal and non-speech signal. In accordance with this embodiment, feature extraction logic 206 only uses the active portion of the speech for feature extraction.

Training logic 208 may be configured to receive feature(s) extracted from one or more portions (e.g., one or more frames) of speech signal 216 by feature extraction logic 206 and process such feature(s) to generate a speaker model 210 for a desired speaker (i.e., either a near-end speaker or a far-end speaker that is speaking). In an embodiment, speaker model 210 is represented as a Gaussian Mixture Model (GMM) that is derived from a universal background model (UBM) stored in communication device 102. That is, the UBM serves as a basis for generating a GMM speaker model for the desired speaker. The GMM speaker model may be generated based on a maximum a posteriori (MAP) method, where a soft class label is generated for each portion (e.g., frame) of input signal received. A soft class label is a value representative of a probability that the portion being analyzed is from the target speaker.

When generating a GMM speaker model, speaker-dependent signatures (i.e., feature(s) extracted by feature extraction logic 206) and/or spatial information (e.g., in an embodiment where a plurality of microphones are used) are obtained to predict the presence of a desired source (e.g., a desired speaker) and interfering sources (e.g., noise) in the portion of the speech signal being analyzed. Each portion may be scored against the spatial information to obtain the soft class label. If the soft class label scores well against the desired source mixture model, then the portion can be used to train the desired GMM speaker model. If the soft class label does not score well against the desired source mixture model, then the portion is not used to train the desired GMM speaker model. In addition to the GMM speaker model, the UBM can also be updated using this information to further assist in GMM speaker model generation. Moreover, the skewed prior probabilities (i.e., soft class labels) of other users for which speaker models are generated can also be leveraged to improve GMM speaker model generation.

Once speaker model 210 is obtained, pattern matching logic 212 may be configured to receive feature(s) extracted from other portion(s) of input speech signal (e.g., frame(s) received subsequent to obtaining speaker model 210) and compare such feature(s) to speaker model 210 to generate a measure of confidence 214, which is indicative of the likelihood that the other portion(s) of speech signal 216 are associated with the user who is speaking. Measure of confidence 214 is continuously generated for each portion (e.g., frame) of speech signal 216 that is analyzed. Measure of confidence 214 may be determined based on a degree of similarity between the feature(s) extracted by feature extraction logic 206 and speaker model 210. The greater the similarity between the extracted feature(s) and speaker model 210, the more likely that speech signal 216 is associated with the user whose voice was used to generate speaker model 210. In an embodiment, measure of confidence 214 is a Logarithmic Likelihood Ratio (LLR), which is the logarithm of the ratio of the conditional probability of the current observation given that the current frame being analyzed is spoken by the target speaker divided by the conditional probability of the current observation given that the current frame being analyzed is not spoken by the target speaker.

Measure of confidence 214 is provided to mode selection logic 220. Mode selection logic 220 may be configured to determine whether measure of confidence 214 exceeds a predefined threshold. In response to determining that measure of confidence 214 exceeds the predefined threshold, mode selection logic 220 may enable a SID-assisted mode for communication device 102 that causes the various speech processing algorithms to operate in a manner that takes into account the identity of the user that is speaking.

Mode selection logic 220 may also provide speaker identification information to the various speech processing algorithms. In an embodiment, the speaker identification information may include an identifier that identifies the user that is speaking. The various speech processing algorithms may use the identifier to retrieve specific models and/or parameters optimized for the identified user and process speech accordingly. The specific models and/or parameters may be retrieved, for example, from a storage component of communication device 102 or from remote storage component on the communication network.

In an embodiment, the enablement of the SID-assisted algorithm features may be "phased-in" gradually over a certain range of the measure of confidence. For example, the contributions from the SID-assisted algorithm features may be scaled from 0 to 1 gradually as the measure of confidence increases over a certain predefined range.

Mode selection logic 220 may also enable training logic 208 to generate a new speaker model in response to determining that another user is speaking during the same communication session. For example, when another speaker begins speaking, portion(s) of speech signal 216 that are generated when the other user speaks are compared to speaker model 210. The speaker model that speech signal 216 is initially compared to is the speaker model associated with the user that was previously speaking. As such, measure of confidence 214 will be lower, as the feature(s) extracted from speech signal 216 that is generated when the other user speaks will be dissimilar to the speaker model. In response to determining that measure of confidence 214 is below a predefined threshold, mode selection logic 220 determines that another user is speaking. Thereafter, training logic 208 generates a new speaker model for the new user. When measure of confidence 214 associated with the new speaker reaches the predefined threshold, mode selection logic 220 enables the SID-assisted mode for communication device 102 that causes the various speech processing algorithms to operate in a manner that takes into account the identity of the new user.

Mode selection logic 220 may also provide speaker identification information that includes an identifier that identifies the new user that is speaking to the various speech processing algorithms. The various speech processing algorithms may use the identifier to retrieve specific models and/or parameters optimized for the new user and process speech accordingly.

Each of the speaker models generated by SID logic 202 may be stored in a storage component of communication device 102 or in an entity on the communication network for subsequent use.

To minimize any degradation of system performance when a new user begins speaking, speech processing logic 204 may be configured to operate in a non-SID assisted mode as long as the measure of confidence generated by SID logic 202 is below a predefined threshold. Such non-SID assisted mode may comprise a default operational mode of communication device 102.

It is noted that even in the case where each user only speaks for a short amount of time before another speaker begins speaking (e.g., in speakerphone/conference mode) and measure of confidence 214 does not exceed the predefined threshold, communication device 102 remains in the default non-SID-assisted mode and will perform just as well as a conventional system without any catastrophic effect.

In an embodiment, SID logic 202 may determine the number of different speakers in the conference call and classify speech signal 216 into N clusters, where N corresponds to the number of different speakers. For example, in an embodiment in which communication device 102 includes a plurality of microphones 104, SID logic 202 may use spatial information (using techniques such as time difference of arrival (TDOA)) to determine that a different user is speaking.

After identifying the number of users, SID logic 202 may then train and update N speaker models 210. N speaker models 210 may be stored in a storage component of communication device 102 or in an entity on the communication network. SID logic 202 may continuously determine which speaker is currently speaking and update the corresponding SID speaker model for that speaker.

If measure of confidence 214 for a particular speaker exceeds the predefined threshold, SID logic 206 may enable the SID-assisted mode for communication device 102 that causes the various speech processing algorithms to operate in a manner that takes into account the identity of that particular speaker. If measure of confidence 214 falls below a predefined threshold (e.g., when another speaker begins speaking), communication device 102 may switch from the SID-assisted mode to the non-SID-assisted mode.

In one embodiment, speaker model(s) may be stored between communication sessions (e.g., in a non-volatile memory of communication device 102 or an entity on the communication network). In this way, every time a user for which a speaker model is stored speaks during a communication session, SID logic 202 may recognize the user talking without having to generate a speaker model for that user. In this way, mode selection logic 220 of SID logic 202 can immediately switch on the SID-assisted mode and use the specific models and/or parameters optimized for that particular speaker to obtain the maximum performance improvement when that user speaks. Furthermore, speaker model(s) 210 may be continuously updated as additional communication sessions are carried out.

In the downlink direction, the number of possible speakers is typically larger than in the uplink direction. Thus, it may not be reasonable to try to train and store a speaker model for each downlink speaker, as this would consume a greater amount of memory. Therefore, in an embodiment, SID logic 202 is configured to store a predetermined number of speaker models for downlink users. For example, in an embodiment, SID logic 202 may store speaker models for speakers that most frequently engage in a communication session with the primary user of communication device 102 (e.g., friends, family, etc.).

In another embodiment, SID logic 202 may utilize a rating system to track how often a particular speaker engages in a communication session and when such communication session(s) occur (e.g., by tracking the date and/or time of each communication session). In accordance with this embodiment, SID logic 202 may only store speaker models for those speakers that have been in a call more often and/or more recently with the primary user. In an embodiment, the rating system may be based on a weighted sum of the amount of time each speaker spent on each communication session, where the weighting factor for each call decreases with the elapsed time from a particular communication session to the present time.

Accordingly, in embodiments, SID logic 202 may operate in various ways to identify near-end users and/or far-end users to cause various speech processing algorithms to operate in a manner that takes into account the identity of the identified speaker. FIG. 3 depicts a flowchart 300 of an example method for processing a speech signal received by communication device 102 based on an identity of near-end speaker(s) or far-end speaker(s) during a communication session. The method of flowchart 300 will now be described with continued reference to communication device 102 of FIGS. 1 and 2, although the method is not limited to that implementation. It is noted that the method of flowchart 300 may be performed with respect to either uplink operations or downlink operations. Other structural and operational embodiments will be apparent to persons skilled in the relevant art(s) based on the discussion regarding flowchart 300 and communication device 102.

Figure 3:
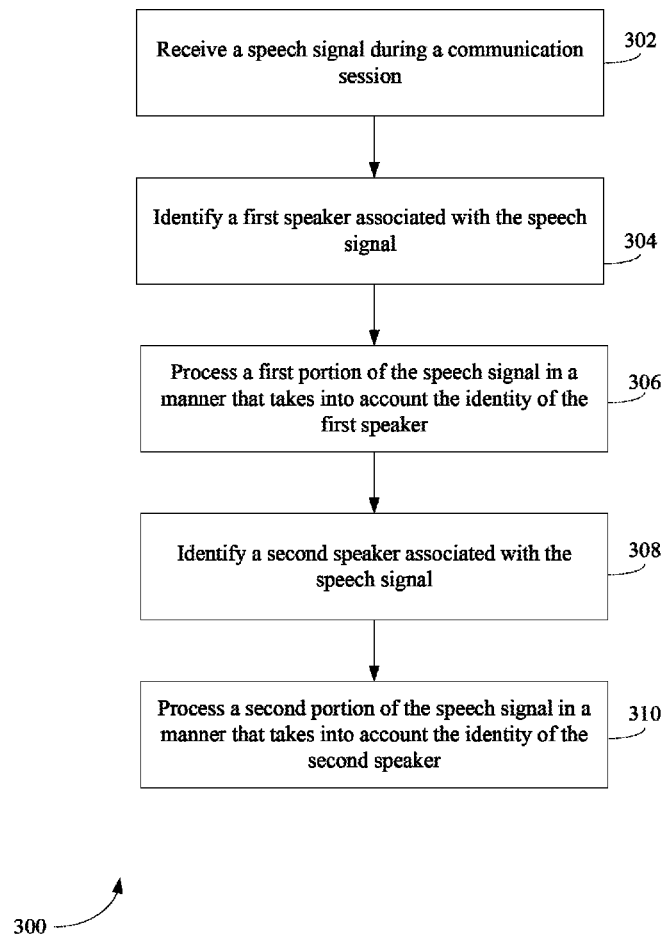
FIG. 3 is a flowchart of an example method for processing a speech signal in accordance with an embodiment.

As shown in FIG. 3, the method of flowchart 300 begins at step 302, in which a speech signal is received during a communication session. For example, with reference to FIG. 2, speech signal 216 is received by SID logic 202 during a communication session. With reference to FIG. 1, in the uplink direction, speech signal 216 may comprise input speech signal 120 that is generated by microphone(s) 104 and received by uplink speech processing logic 106 and uplink SID logic 116. In the downlink direction, speech signal 216 may comprise downlink speech signal 124 that is received by downlink speech processing logic 112 and downlink SID logic 118.

At step 304, a first speaker associated with the speech signal is identified. For example, with reference to FIG. 2, SID logic 202 identifies the first speaker associated with speech signal 216. With reference to FIG. 1, in the uplink direction, SID logic 202 comprises uplink SID logic 116, which identifies the first speaker (i.e., a near-end speaker) associated with input speech signal 120. In the downlink direction, SID logic 202 comprises downlink SID logic 118, which identifies the first speaker (i.e., a far-end speaker) associated with downlink speech signal 124.

At step 306, a first portion of the speech signal is processed in a manner that takes into account the identity of the first speaker. For example, with reference to FIG. 2, speech processing logic 204 processes the first portion of speech signal 216 in a manner that takes into account the identity of the first speaker. With reference to FIG. 1, in the uplink direction, speech processing logic 204 comprises uplink speech processing logic 106, which processes the first portion of input speech signal 120 in a manner that takes into account the identity of the first speaker. In the downlink direction, speech processing logic 204 comprises downlink speech processing logic 112, which processes the first portion of downlink speech signal 124 in a manner that takes into account the identity of the first speaker. For example, speech processing logic 204 may replace and/or update generic speech parameters and/or filter coefficients (e.g., for various filters including, but not limited to, linear filter(s), short-term synthesis filter(s), long-term synthesis filter(s)) used by speech processing logic with speech parameters and/or filter coefficients that are specific to the first speaker and processes the first portion of downlink speech signal 124 accordingly.

In an embodiment, the first portion of the speech signal is one or more frames of the speech signal associated with the first speaker (i.e., that were generated as a result of the first speaker speaking).

At step 308, a second speaker associated with the speech signal is identified. For example, with reference to FIG. 2, SID logic 202 identifies the second speaker associated with speech signal 216. With reference to FIG. 1, in the uplink direction, SID logic 202 comprises uplink SID logic 116, which identifies the second speaker (i.e., another near-end speaker that is speaking that is different than the first near-end speaker) associated with input speech signal 120. In the downlink direction, SID logic 202 comprises downlink SID logic 118, which identifies the second speaker (i.e., another far-end speaker that is speaking that is different than the first far-end speaker) associated with downlink speech signal 124. In an embodiment, the second speaker is identified in accordance to FIGS. 5 and 6, as will be described below.

At step 310, a second portion of the speech signal is processed in a manner that takes into account the identity of the second speaker. For example, with reference to FIG. 2, speech processing logic 204 processes the second portion of speech signal 216 in a manner that takes into account the identity of the second speaker. With reference to FIG. 1, in the uplink direction, speech processing logic 204 comprises uplink speech processing logic 106, which processes the second portion of input speech signal 120 in a manner that takes into account the identity of the second speaker. In the downlink direction, speech processing logic 204 comprises downlink speech processing logic 112, which processes the second portion of downlink speech signal 124 in a manner that takes into account the identity of the second speaker. For example, speech processing logic 204 may replace and/or update generic speech parameters and/or filter coefficients (e.g., for various filters used by speech processing logic with speech parameters and/or filter coefficients that are specific to the second speaker) and processes the second portion of downlink speech signal 124 accordingly.

In an embodiment, the second portion of the speech signal is one or more frames of the speech signal associated with the second speaker (i.e., that were generated as a result of the second speaker speaking).

Figure 4:
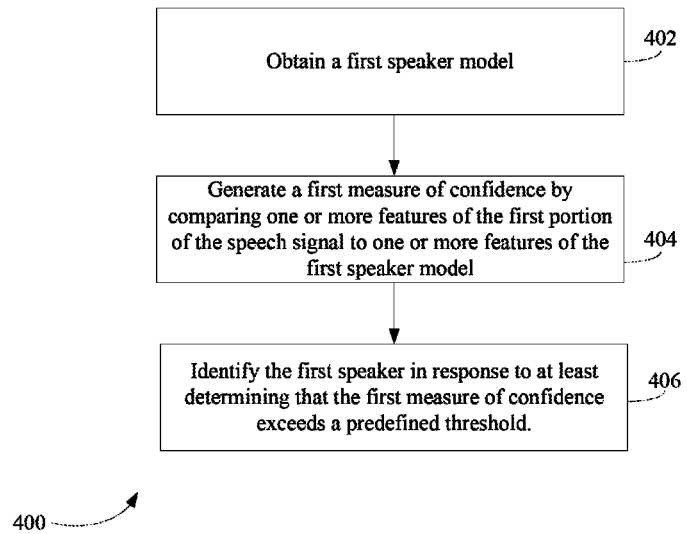
FIG. 4 is a flowchart of an example method for identifying a first speaker in accordance with an embodiment.

FIG. 4 depicts a flowchart 400 of an example method for identifying a first speaker in accordance to an embodiment. The method of flowchart 400 may be utilized, for example, to implement step 304 of flowchart 300. The method of flowchart 400 will now be described with continued reference to communication device 102 of FIGS. 1 and 2, although the method is not limited to that implementation. It is noted that the method of flowchart 400 may be performed with respect to either uplink operations or downlink operations. Other structural and operational embodiments will be apparent to persons skilled in the relevant art(s) based on the discussion regarding flowchart 400 and communication device 102.

As shown in FIG. 4, the method of flowchart 400 begins at step 402, in which a first speaker model is obtained. In an embodiment, the first speaker model is obtained by analyzing portions of speech signal 216. For example, feature extraction logic 206 acquires speech signal 216 and continuously collects and analyzes portions of speech signal 216 to extract feature(s) from speech signal 216 during a communication session with another user. Such features may include, for example, reflection coefficients (RCs), log-area ratios (LARs), arcsin of RCs, line spectrum pair (LSP) frequencies, and the linear prediction (LP) ceptrsum. Training logic 208 may be configured to receive the feature(s) extracted and processes such feature(s) to generate speaker model 210 for the first speaker.

In another embodiment, the first speaker model is obtained from a storage component of communication device 102 or from an entity on a communication network. For example, the first speaker model may have been generated during a previous communication session in which the first speaker was engaged and stored in a storage component of communication device 102 or in remote storage component on the communication network.

At step 404, a first measure of confidence is generated by comparing feature(s) of the portion of the speech signal to feature(s) of the first speaker model. For example, with reference to FIG. 2, pattern matching logic 212 compares the feature(s) extracted by feature extraction logic 206 to feature(s) of the first speaker model (e.g., speaker model 210) and generates measure of confidence 214.

Measure of confidence 214 may be based on the degree of similarity between the feature(s) extracted by feature extraction logic 206 and speaker model 210. In an embodiment, measure of confidence 214 is a Logarithmic Likelihood Ratio (LLR), which is the logarithm of the ratio of the conditional probability of the current observation given that the current portion being analyzed is spoken by the first speaker divided by the conditional probability of the current observation given that the current portion being analyzed is not spoken by the first speaker.

At step 406, the first speaker is identified in response to at least determining that the first measure of confidence exceeds a predefined threshold. For example, with reference to FIG. 2, mode selection logic 220 of SID logic 202 identifies the first speaker in response to at least determining that the first measure of confidence exceeds a predefined threshold and enables the SID-assisted mode for communication device 102 that causes the various speech processing algorithms of speech processing logic 204 to operate in a manner that takes into account the identity of the first speaker.

Figure 5:
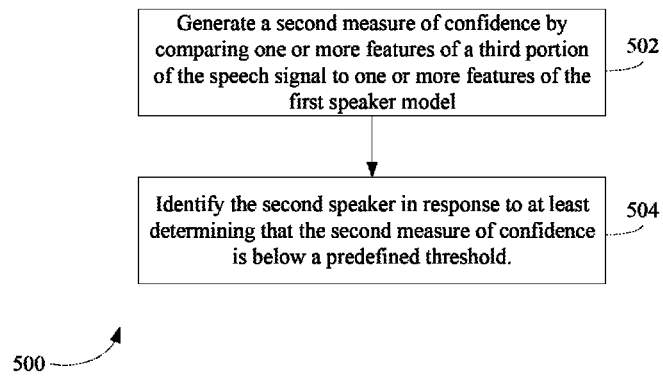
FIG. 5 is a flowchart of an example method for identifying a second speaker in accordance with an embodiment.

FIG. 5 depicts a flowchart 500 of an example method for identifying a second speaker in accordance to an embodiment. The method of flowchart 500 may be utilized, for example, to implement step 308 of flowchart 300. The method of flowchart 500 will now be described with continued reference to communication device 102 of FIGS. 1 and 2, although the method is not limited to that implementation. It is noted that the method of flowchart 500 may be performed with respect to either uplink operations or downlink operations. Other structural and operational embodiments will be apparent to persons skilled in the relevant art(s) based on the discussion regarding flowchart 500 and communication device 102.

As shown in FIG. 5, the method of flowchart 500 begins at step 502, in which a second measure of confidence is generated by comparing feature(s) of a third portion of the speech signal to feature(s) of the first speaker model. For example, with reference to FIG. 2, pattern matching logic 212 compares feature(s) of the third portion of speech signal 216 extracted by feature extraction logic 206 to feature(s) of the first speaker model (e.g., speaker model 210) and generates measure of confidence 214.

At step 504, the second speaker is identified in response to at least determining that the second measure of confidence is below a predefined threshold. For example, with reference to FIG. 2, mode selection logic 220 of SID logic 202 identifies the second speaker in response to at least determining that measure of confidence 214 is below a predefined threshold.

For example, when another speaker begins speaking, the third portion(s) of speech signal 210 that are generated when the second speaker speaks are compared to speaker model 210. The speaker model that speech signal 216 is compared to is the speaker model associated with user that was previously speaking (i.e., the first speaker). As such, measure of confidence 214 will be lower, as the feature(s) extracted for the third portion(s) of speech signal 216 that is generated when the other user speaks will be dissimilar to the speaker model.

Figure 6:
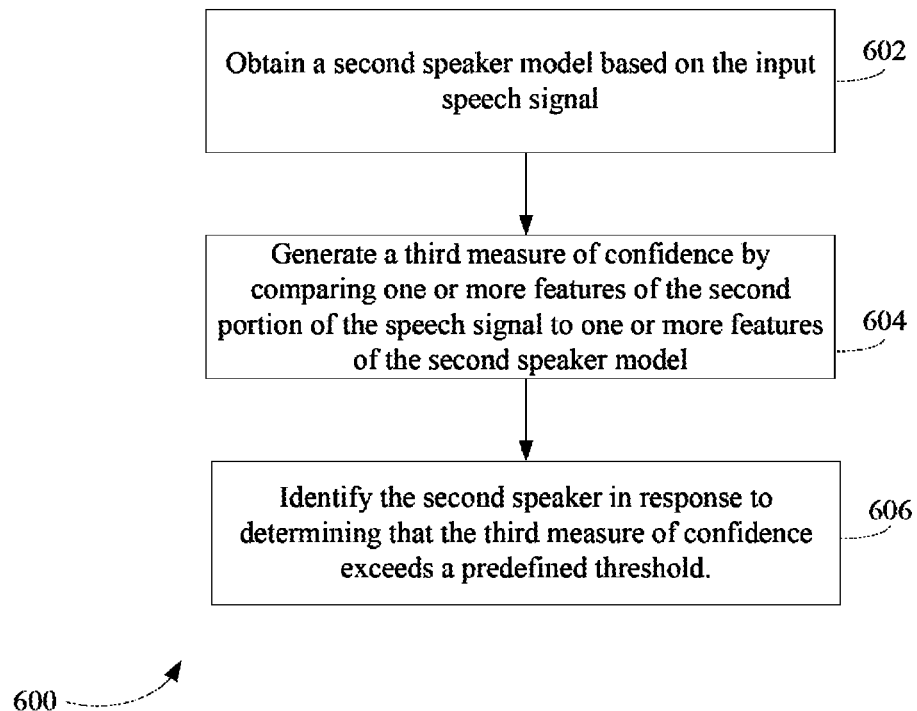
FIG. 6 is a flowchart of an example method illustrating further steps for identifying the second speaker in accordance with an embodiment.

FIG. 6 depicts a flowchart 600 of an example method illustrating further steps for identifying the second speaker in accordance to an embodiment. The method of flowchart 600 will now be described with continued reference to communication device 102 of FIGS. 1 and 2, although the method is not limited to that implementation. It is noted that the method of flowchart 600 may be performed with respect to either uplink operations or downlink operations. Other structural and operational embodiments will be apparent to persons skilled in the relevant art(s) based on the discussion regarding flowchart 600 and communication device 102.

As shown in FIG. 6, the method of flowchart 600 begins at step 602, in which a second speaker model is obtained based on the input speech signal. In an embodiment, the second speaker model is obtained by analyzing portions of speech signal 216. For example, with reference to FIG. 2, feature extraction logic 206 acquires speech signal 216 and continuously collects and analyzes portions of speech signal 216 to extract feature(s) from speech signal 216 during a communication session with another user.

In another embodiment, the second speaker model is obtained from a storage component of communication device 102 or from an entity on a communication network. For example, the second speaker model may have been generated during a previous communication session in which the second speaker was engaged and stored in a storage component of communication device 102 or in remote storage component on the communication network. In accordance with certain embodiments, to determine which speaker model to obtain for the second speaker, portions of speech signal 216 may be compared to each of the stored speaker models. The speaker model that provides the closest match to the portions of speech signal 216 may be used as the second speaker model.

At step 604, a third measure of confidence is generated by comparing feature(s) of the second portion of the speech signal to feature(s) of the second speaker model. For example, with reference to FIG. 2, pattern matching logic 212 compares the feature(s) extracted from the second portion of speech signal 216 by feature extraction logic 206 to feature(s) of the second speaker model (e.g., speaker model 210) and generates measure of confidence 214.

At step 606, the second speaker is identified in response to determining that the third measure of confidence exceeds a predefined threshold. For example, with reference to FIG. 2, mode selection logic 220 of SID logic 202 identifies the second speaker in response to determining that the third measure of confidence exceeds a predefined threshold and enables the SID-assisted mode for communication device 102 that causes the various speech processing algorithms of speech processing logic 204 to operate in a manner that takes into account the identity of the second speaker.

In one embodiment, steps 304 and 308 of flowchart 300 may be performed using at least one biometric recognition and facial recognition. Examples of biometric recognition include, but are not limited to, retina and/or iris scanning, fingerprint scanning, and/or the like.

In accordance with this embodiment, communication device 102 includes logic for performing biometric and/or facial recognition techniques to identify the first speaker and/or the second speaker. For example, in an embodiment where communication device 102 uses fingerprint scanning, communication device 102 may identify a speaker in response to the speaker placing his or her finger on a fingerprint reader included in communication device 102.

In an embodiment where communication device 102 uses facial recognition techniques, the person facing a camera included in communication device 102 can be identified as the speaker. Facial recognition techniques can also be combined with other techniques in order to eliminate false recognition. For example, such other techniques may operate to determine if the person facing the camera is also the one who is talking (whose lips are moving), from which a high signal-to-noise ratio (SNR) speech is received. Furthermore, communication device 102 may also include a gyro sensor or the like, which can determine whether communication device 102 is being in a legitimate position for conducting a communication session.

In accordance with either embodiment, upon identifying the first and/or second speaker, SID logic 202 determines whether specific models and/or parameters optimized for the identified speaker (which are used to process speech signal 216) are stored on communication device 102. In the event that no models and/or parameters are stored for the identified speaker, SID logic 202 generates a speaker model for the identified speaker.

III. Example Systems and Methods for Performing SID Operations Based on Multiple Input Signals Provided to the SID Logic As described above in reference to FIG. 1, uplink SID logic 116 and downlink SID logic 118 perform SID operations on one speech signal, respectively. For example, uplink SID logic 116 performs SID operations on input speech signal 120, and downlink SID logic 118 performs SID operations on downlink speech signal 124. In another embodiment, each of uplink SID logic 116 and downlink SID logic 118 performs SID operations on more than one speech signal. In particular, uplink SID logic 116 may be configured to use the input speech signal 120 and one or more processed versions of input speech signal 120 that are generated by SID-assisted uplink speech processing algorithm(s) to generate increasingly accurate speaker models (e.g., for near-end speakers) and measures of confidence. Similarly, downlink SID logic 118 may configured to use the downlink speech signal 124 and one or more processed versions of downlink speech signal 124 that are generated by SID-assisted downlink speech processing algorithm(s) to generate increasingly accurate speaker models (e.g., for far-end speakers) and measures of confidence.

Figure 7:
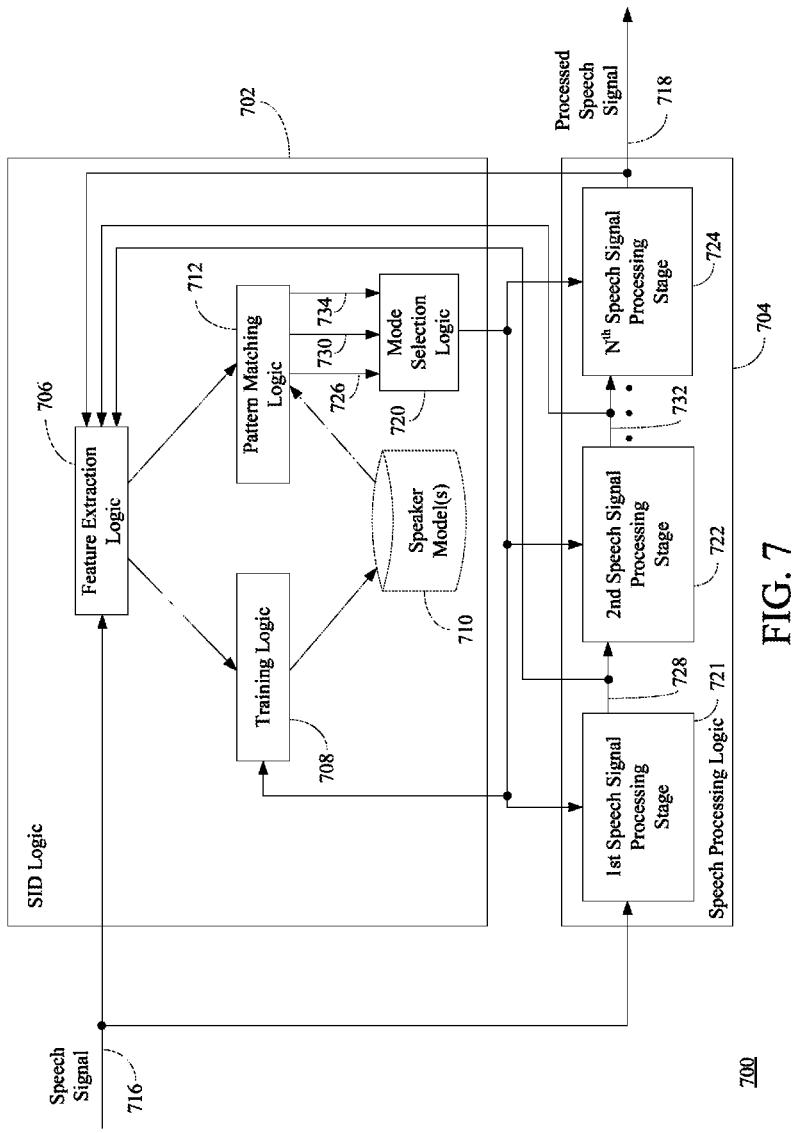
FIG. 7 is a block diagram of speaker identification logic coupled to speech processing logic that includes a plurality of signal processing stages in accordance with an embodiment.

FIG. 7 is a block diagram 700 of example SID logic 202 coupled to speech processing logic 704 that includes a plurality of signal processing stages in accordance with an embodiment. SID logic 702 may be an implementation of uplink SID logic 116 or downlink SID logic 118. For example, in an implementation in which SID logic 702 comprises uplink SID logic 116, speech signal 716 may correspond to input speech signal 120 and speech processing logic 704 may correspond to uplink speech processing logic 106. In an implementation in which SID logic 702 comprises downlink SID logic 118, speech signal 716 may correspond to downlink speech signal 124 and speech processing logic 704 may correspond to downlink speech processing logic 112. Feature extraction logic 706, training logic 708, pattern matching logic 712 and mode selection logic 720 operate in a similar manner to like-named elements described above in reference to FIG. 2 to generate speaker model(s), measure(s) of confidence, to identify speaker(s), and to enable/disable the SID-assisted mode.

Speech processing logic 704 includes N signal processing stages, 721, 722, and 724, wherein N is an integer greater than 1. Each of signal processing stages 721, 722 and 724 represent a respective speech processing algorithm. For example, in an implementation where speech processing logic 704 comprises uplink speech processing logic 106, such speech processing algorithms may include, but are not limited to acoustic echo cancellation, residual echo suppression, single channel or multi-microphone noise suppression, voice activity detection, wind noise reduction, speech encoding, or the like. In an implementation in which speech processing logic 704 comprises downlink speech processing logic 112, such speech processing algorithms may include, but are not limited to, joint source channel decoding, bit error concealment, speech decoding, packet loss concealment, speech intelligibility enhancement, acoustic shock protection, or the like.

As described earlier, in response to mode selection logic 720 determining that a measure of confidence that is indicative of the likelihood that a speech signal received by communication device 102 is associated with a target speaker exceeds a predetermined threshold, a SID-assisted mode for communication device 102 is enabled. Mode selection logic 720 may also provide speaker identification information (e.g., such as an identifier that identifies the user that is speaking) to the various speech processing algorithms.

When the SID-assisted mode is enabled, speech processing logic 704 performs various speech processing algorithms in a manner that takes into account the identity of the target speaker. Many of these speech processing algorithms enhance the speech signal. For example, in the uplink direction, background noise and/or echo received via microphone(s) 104 may be cancelled and/or suppressed from the speech signal. In the downlink direction, distortion that exists in the speech signal due to channel errors of the communication network may be removed. These improved or enhanced versions of the speech signal can be used as additional input signals for SID logic 702 to improve the SID performance.

Such a technique can be performed during multiple speech processing stages in either the uplink or downlink directions. Consider the following example in the uplink direction, in which speech processing logic 704 is an example of uplink speech processing logic 106 (as shown in FIG. 1). Suppose that first speech signal processing stage 721 is an acoustic echo canceller (AEC), second speech signal processing stage 722 is a dual-microphone noise reducer, and third speech signal processing stage 724 is a single-channel noise suppressor, and processed speech signal 718 is provided as uplink speech signal 122 and/or to additional logic of communication device 102 (e.g., a voice command recognition system).

Speech signal 716 is initially provided to SID logic 702, which generates speaker model 710 and a first measure of confidence 726 that is indicative of the likelihood that the speech signal 716 is associated with a target near-end speaker. First measure of confidence 726 is provided to mode selection logic 720 of SID logic 702. In response to determining that first measure of confidence 726 exceeds a predefined threshold, mode selection logic 720 enables an SID-assisted mode for first speech signal processing state 721 (i.e., AEC 721) and/or provides speaker identification information to AEC 721. AEC 721 processes speech signal 716 in a manner that takes into account the identity of the near-end speaker to enable AEC 721 achieve better performance Once AEC 721 achieves better performance and removes most of the echo, signal(s) 728 output from AEC 721 are provided to SID logic 702 and second signal processing stage 722 (i.e., the noise reducer). SID logic 702 uses signal(s) 728 as input signals in addition to or in lieu of speech signal 716 to generate and/or update speaker model 710 and a second measure of confidence 730 that is indicative of the likelihood that signal(s) 728 and/or speech signal 716 is associated with the target near-end speaker. With the echo mostly removed in signal(s) 728, updated speaker model 710 and/or second measure of confidence 730 is more accurate and reliable than the initial speaker model and/or first measure of confidence 726 generated using solely speech signal 716.

Second measure of confidence 730 is provided to mode selection logic 720. In response to determining that second measure of confidence 730 exceeds a predefined threshold, mode selection logic 720 enables an SID-assisted mode for dual-channel noise reducer 722 and/or provides speaker identification information to dual-channel noise reducer 722. Dual-channel noise reducer 722 performs operations to reduce noise on signal(s) 728 and converts signal(s) 728 into a single-channel signal 732 in a manner that takes into account the identity of the near-end speaker to enable dual-channel noise reducer 722 to achieve better performance.

Once dual-channel noise reducer 722 achieves better performance and cleans up more background noise, single-channel signal 732 is provided to SID logic 702 and $N^{th}$ signal processing stage 724 (i.e., a single-channel noise suppressor). SID logic 702 uses single-channel signal 732 as an input signal in addition to or in lieu of speech signal 716 and/or signal(s) 728 to generate and/or update speaker model 710 and a third measure of confidence 734 that is indicative of the likelihood that the signal(s) 732 and/or speech signal 716 is associated with the target near-end speaker. With the echo and noise mostly removed in signal(s) 728, updated speaker model 710 and/or third measure of confidence 734 is even more accurate and reliable than a previous version of speaker model, first measure of confidence 726, and/or second measure of confidence 730 generated using speech signal 716 and/or signal(s) 728.

Third measure of confidence 734 is provided to mode selection logic 720. In response to determining that third measure of confidence 734 exceeds a predefined threshold, mode selection logic 720 enables an SID-assisted mode for single-channel noise suppressor 724 and/or provides speaker identification information to single-channel noise suppressor 724. Single-channel noise suppressor 724 performs operations to suppress noise on single-channel signal 732 in a manner that takes into account the identity of the near-end speaker to enable single-channel noise suppressor 724 to achieve better performance.

Once single-channel noise suppressor 724 achieves better performance and suppresses even more background noise, processed speech signal 718 is output from noise reducer 724 and provided as processed speech signal 718 and/or to other logic of communication device 102 (e.g., a voice command recognition system). Accordingly, speaker model(s) and measures of confidence generated by SID logic 702 are iteratively improved and each of the processing stages iteratively benefit as a result.

Similarly, in the downlink direction, SID logic 702 can take the output signals of intermediate stages in the downlink signal processing chain as additional input signals to iteratively generate and update speaker model(s) and obtain more and more reliable measures of confidence. This will help later stages achieve better performance than using only a single SID input signal. That is, by using cleaner signals to generate speaker model(s), the more likely SID logic 202 will generate a measure of confidence that exceeds the predefined threshold. Thus, even if a certain speech signal processing stage is not able to take advantage of the SID-assisted mode due to the measure of confidence not exceeding the predefined threshold before or during this stage, subsequent speech signal processing stage(s) may be able to do so. For example, if a more reliable measure of confidence is generated and exceeds the predefined threshold by using signals output from the previous speech signal processing stage, the SID-assisted mode for subsequent speech processing stage(s) may be enabled.

Furthermore, in an embodiment in which the enablement of the SID-assisted algorithm features may be "phased-in" gradually over a certain range of the measure of confidence, each speech signal processing stage may receive a measure of confidence that is higher than the measure of confidence received by the previous speech signal processing stage. Accordingly, the degree of SID-assistance may increase from one speech signal processing stage to the next.

In such a scheme, the complexity of SID logic 702 may be increased when compared with a simpler SID scheme using only one input signal (e.g., speech signal 716). However, even if additional SID operations are performed at each stage in the speech processing chain, it is likely that some sharing of operations or memory can occur between different stages so that an embodiment where SID logic 702 uses multiple inputs still has a lower overall complexity than having independent SID logic blocks 702 for each stage of processing. In any case, there is a trade-off between complexity and performance, but such an embodiment may allow a system designer to choose the best trade-off between complexity and performance. For example, SID logic 702 may be configured such that the system designer is not forced to use only one input speech signal for each of the independent SID logic blocks 702 or use all intermediate signals at every stage in the processing chain as the input signals to SID logic 702; instead, the system designer is free to pick and choose any subset of the intermediate signals at various stages in the processing chain as the input signals to SID logic 702 to obtain the best trade-off between complexity and performance.

Figure 8:
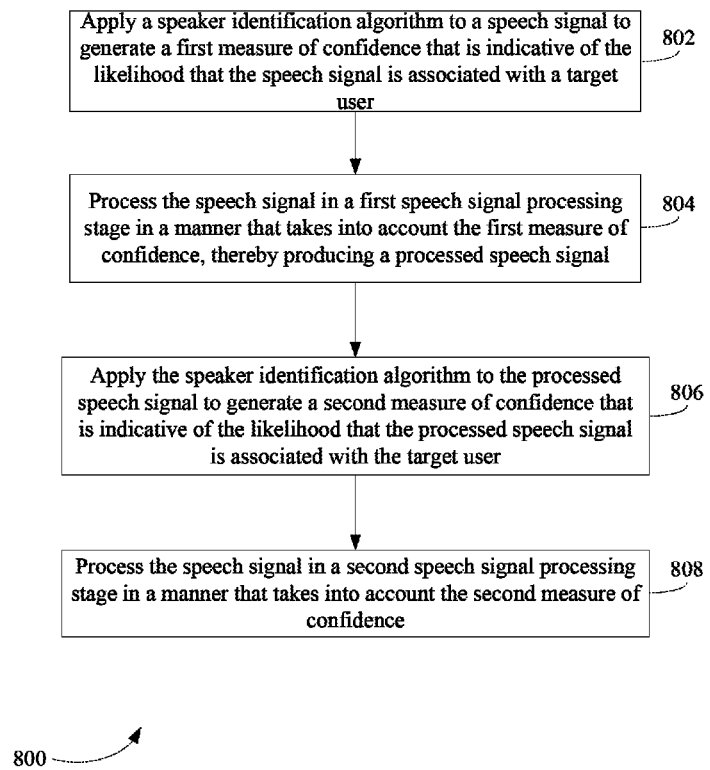
FIG. 8 is a flowchart of an example method for performing speaker identification operations on more than one speech signal in accordance with an embodiment.

FIG. 8 depicts a flowchart 800 of an example method for performing speaker identification operations on more than one speech signal in accordance to an embodiment. The method of flowchart 800 will now be described with continued reference to SID logic 702 and speech processing logic 704 of FIG. 7, although the method is not limited to that implementation. It is noted that the method of flowchart 800 may be performed for either uplink operations or downlink operations. Other structural and operational embodiments will be apparent to persons skilled in the relevant art(s) based on the discussion regarding flowchart 800, SID logic 702 and speech processing logic 704.

As shown in FIG. 8, the method of flowchart 800 begins at step 802, in which a speaker identification algorithm is applied to a speech signal to generate a first measure of confidence that is indicative of the likelihood that the speech signal is associated with a target user. For example, with reference to FIG. 7, SID logic 702 applies a speaker identification algorithm to speech signal 716 and generates a first measure of confidence 726.

In an embodiment, the speaker identification algorithm applied to the speech signal includes obtaining a speaker model. The speaker model may be obtained in a similar manner as described above with respect to step 402 of FIG. 4. For example, the speaker model may be obtained by analyzing portions of speech signal 716. In another example, the speaker model may be obtained from a storage component of communication device 102 or from an entity on a communication network.

The speaker identification algorithm may further include comparing feature(s) of a portion of the speech signal to feature(s) of the speaker model and generating the first measure of confidence based on the comparison. For example, similar to the manner described above with respect to step 404 of FIG. 4, pattern matching logic 712 may compare feature(s) extracted from speech signal 716 by feature extraction logic 706 to feature(s) of the speaker model (e.g., speaker model 710) and generate first measure of confidence 716 based on this comparison.

At step 804, the speech signal is processed in a first speech signal processing stage in a manner that takes into account the first measure of confidence, thereby producing a processed speech signal. For example, with reference to FIG. 7, first speech signal processing stage 721 processes speech signal 716 in a manner that takes into account first measure of confidence 726 and produces processed speech signal 728.

In an embodiment, first speech signal processing stage 721 processes speech signal 716 in a manner that takes into account the first measure of confidence 726 by determining whether first measure of confidence 726 exceeds a predetermined threshold. In response to determining that first measure of confidence 726 exceeds the predetermined threshold, an SID-assisted mode is enabled for first speech signal processing stage 721, and first speech signal processing stage 721 processes speech signal 716 accordingly (i.e., in a manner that takes into account the identity of the target speaker). In response to determining that first measure of confidence 726 does not exceed the predetermined threshold, first speech signal processing stage 721 remains in the non-SID assisted mode and processes speech signal 716 accordingly.

At step 806, the speaker identification algorithm is applied to the processed speech signal to generate a second measure of confidence that is indicative of the likelihood that the processed speech signal is associated with the target user. For example, with reference to FIG. 7, SID logic 702 applies the speaker identification algorithm to processed speech signal 728 and generates a second measure of confidence 730.

In an embodiment, the speaker identification algorithm applied to the processed speech signal includes obtaining a speaker model. The speaker model may be obtained in a similar manner as described above with respect to step 402 of FIG. 4. For example, the speaker model may be obtained by analyzing portions of processed speech signal 728 and/or speech signal 716.

The speaker identification algorithm may further include comparing feature(s) of a portion of the processed speech signal to feature(s) of the speaker model and generating the second measure of confidence based on the comparison. For example, similar to the manner described above with respect to step 404 of FIG. 4, pattern matching logic 712 may compare feature(s) extracted from processed speech signal 728 by feature extraction logic 706 to feature(s) of the speaker model (e.g., speaker model 710) and generate second measure of confidence 730 based on this comparison.

At step 808, the processed speech signal is processed in a second speech signal processing stage in a manner that takes into account the second measure of confidence. For example, with reference to FIG. 7, second speech signal processing stage 722 processes processed speech signal 728 in a manner that takes into account second measure of confidence 730. In an embodiment, second speech signal processing stage 722 processes processed speech signal 728 in a manner that takes into account second measure of confidence 730 by determining whether second measure of confidence 730 exceeds a predetermined threshold. In response to determining that second measure of confidence 730 exceeds the predetermined threshold, an SID-assisted mode is enabled for second speech signal processing stage 722, and second speech signal processing stage 722 processes processed speech signal 728 accordingly (i.e., in a manner that takes into account the identity of the target speaker). In response to determining that second measure of confidence 730 does not exceed the predetermined threshold, second speech signal processing stage 722 remains in the non-SID assisted mode and processes processed speech signal 728 accordingly.

IV. Other Embodiments

The foregoing description suggests that when SID logic (e.g., SID logic 202) identifies a target user, specific models and/or parameters that are optimized for the target user are used by one or more speech processing algorithms to improve the performance thereof. However, the speech processing algorithm(s) may also use a weighted combination of models and/or parameters that are optimized based on a plurality of measures of confidences associated with one or more target users. It is noted that the specific models and/or parameters described herein are in reference to models and/or parameters used by speech processing algorithm(s) and are not to be interpreted as the speaker models described in the preceding sections.

For example, consider an embodiment where a plurality of speaker models for a plurality of users have been generated and stored in a communication device (e.g., communication device 102). In accordance with such an embodiment, when a speaker begins speaking and produces a speech signal, SID logic 202 may generate a plurality of measures of confidence for the user, where each measure of confidence is indicative of the likelihood that the speech signal is associated with a particular speaker model. For instance, suppose that three speaker model(s) have been generated and stored, where the first speaker model is associated with User A, the second speaker model is associated with User B, and the third speaker model is associated with User C. When a user (e.g., User A) begins speaking, SID logic 202 generates a first measure of confidence that is indicative of the likelihood that the speech signal produced by User A is associated with the first speaker model (i.e., User A), a second measure of confidence that is indicative of the likelihood that the speech signal produced by User A is associated with the second speaker model (i.e., User B), and a third measure of confidence that is indicative of the likelihood that the speech signal produced by User A is associated with the third speaker model (i.e., User C). For illustrative purposes, the first measure of confidence may indicate a likelihood of 60% that the person speaking is User A, the second measure of confidence may indicate a likelihood of 25% that the person speaking is User B, and the third measure of confidence may indicate a likelihood of 15% that the person speaking is User C.

Speaker identification information including these measures of confidence may be provided to speech processing logic (e.g., speech processing logic 204). Along with each measure of confidence, the speaker identification information may also include an identifier that identifies the speaker associated with a respective measure of confidence.

One or more speech processing algorithms performed by speech processing logic 204 may use a weighted combination of models and/or parameters associated with each of the speakers associated with a measure of confidence (as identified by each identifier) that are optimized based on the three measures of confidence generated for the user speaking (i.e., User A). In an embodiment, each weight used is equal is to a respective measure of confidence. In another embodiment, each weight is based on a probabilistic measure derived from a respective measure of confidence.

Speech processing algorithm(s) may also use a weighted combination of models and/or parameters that are optimized based on at least one measure of confidence associated with at least one target user and a measure of confidence associated with a generic user. For example, consider an embodiment where at least one speaker model for at least one user has been generated and stored in a communication device (e.g., communication device 102) along with a generic speaker model representative of the speech characteristics of the general population. In accordance with such an embodiment, when a speaker begins speaking and produces a speech signal, SID logic 202 may generate a first measure of confidence for the user that is indicative of the likelihood that the speech signal is associated with the at least one speaker model and generate a second measure of confidence for the user that is indicative of the likelihood that the speech signal is associated with the generic user. For instance, suppose the first speaker model is associated with User A, and a second speaker model is associated with the generic user. When a user (e.g., User A) begins speaking, SID logic 202 generates a first measure of confidence that is indicative of the likelihood that the speech signal produced by User A is associated with the first speaker model (i.e., User A) and a second measure of confidence that is indicative of the likelihood that the speech signal produced by User A is associated with the generic user. For illustrative purposes, the first measure of confidence may indicate a likelihood of 20% that the person speaking is User A, and the second measure of confidence may indicate a likelihood of 80% that the person speaking is a generic user. Accordingly, speech processing algorithm(s) performed by speech processing logic 204 may use a weighted combination of models and/or parameters associated with each of the at least one target user and the generic user that are optimized based on the measures of confidence generated for the user speaking (i.e., User A).

As the measure of confidence indicating that the person speaking is a target user increases over time, the contribution attributed to the models and/or parameters of the target user also increases (as the contribution attributed to the models and/or parameters of the generic user decreases). This advantageously enables SID-assisted speech processing algorithms to be "phased-in" gradually over time.

In yet another embodiment, during a speakerphone/conference mode, the models and/or parameters used by speech processing algorithm(s) may be further weighted based on certain characteristics of a user speaking. Such characteristics include, but are not limited to the type of user, the signal level of the speech signal produced by the user, the total duration of the user speaking and/or the like. For example, in accordance with an embodiment where the models and/or parameters are further weighted based on the type of user, a greater weight may be given to the models and/or parameters associated with the primary user of the communication device (e.g., the owner) than compared to secondary users (e.g., friends, family members, co-workers, etc. of the primary owner) if a determination is made that the person speaking is likely a primary user of the communication device.

In accordance with an embodiment where the models and/or parameters are further weighted based on the signal level of the speech signal produced by the user, a greater weight may be given to the models and/or parameters associated with user(s) who are speaking more loudly as compared to other user(s) that are speaking more softly.

In accordance with an embodiment where the models and/or parameters are further weighted based on the duration of a speaker speaking, a greater weight may be given to the models and/or parameters associated with user(s) who are speaking for a longer amount of time than compared to other users who are speaking for a lesser amount of time.

In a further embodiment, the speaker identification information provided to the speech processing logic may also include a measure of confidence indicative of the likelihood that the speech signal is a noise signal or some other signal that is not representative of a speaker. Such a measure of confidence may also be used to improve the performance of the various speech processing algorithm(s) of the speech processing logic. For example, in an embodiment where a speech processing algorithm is a noise suppressor, the level of noise suppression applied may be determined based on such a measure of confidence.

V. Example Computer System Implementation

Figure 9:
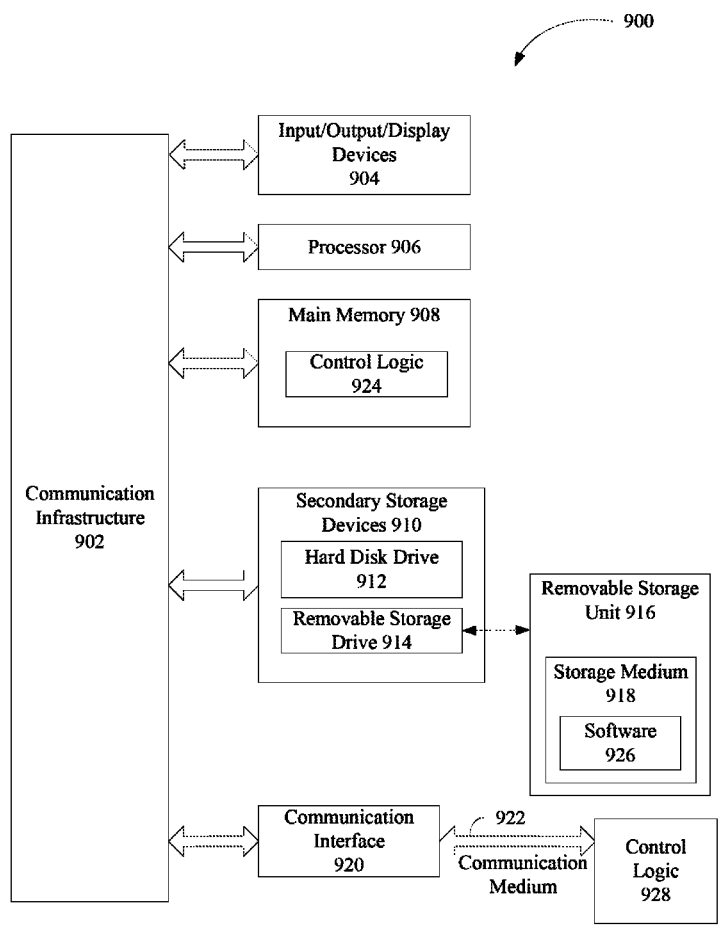
FIG. 9 is a block diagram of an example computer system in which embodiments may be implemented.

The embodiments described herein, including systems, methods/processes, and/or apparatuses, may be implemented using well known computers, such as computer 900 shown in FIG. 9. For example, elements of communication device 102, including uplink speech processing logic 106, downlink speaker processing logic 112, uplink SID logic 116, downlink SID logic 118, and elements thereof; elements of SID logic 202, including feature extraction logic 206, training logic 208, speaker model(s) 210, pattern matching logic 212 and elements thereof; speech processing logic 204 and elements thereof; elements of SID logic 702, including feature extraction logic 706, training logic 708, speaker model(s) 710, pattern matching logic 712 and elements thereof; elements of speech processing logic 704, including first speech signal processing stage 721, second speech signal processing stage 722, $N^{th}$ speech signal processing stage 724 and elements thereof; each of the steps of flowchart 300 depicted in FIG. 3; each of the steps of flowchart 400 depicted in FIG. 4, each of the steps of flowchart 500 depicted in FIG. 5, each of the steps of flowchart 600 depicted in FIG. 6, and each of the steps of flowchart 800 depicted in FIG. 8 can each be implemented using one or more computers 900.

Computer 900 can be any commercially available and well known computer capable of performing the functions described herein, such as computers available from International Business Machines, Apple, Sun, HP, Dell, Cray, etc. Computer 900 may be any type of computer, including a desktop computer, a laptop computer, or a mobile device, including a cell phone, a tablet, a personal data assistant (PDA), a handheld computer, and/or the like.

As shown in FIG. 9, computer 900 includes one or more processors (e.g., central processing units (CPUs) or digital signal processors (DSPs)), such as processor 906. Processor 906 may include elements of communication device 102, including uplink speech processing logic 106, downlink speaker processing logic 112, uplink SID logic 116, downlink SID logic 118, and elements thereof; elements of SID logic 202, including feature extraction logic 206, training logic 208, speaker model(s) 210, pattern matching logic 212 and elements thereof; speech processing logic 204 and elements thereof; elements of SID logic 702, including feature extraction logic 706, training logic 708, speaker model(s) 710, pattern matching logic 712 and elements thereof; elements of speech processing logic 704, including first speech signal processing stage 721, second speech signal processing stage 722, $N^{th}$ speech signal processing stage 724 and elements thereof; or any portion or combination thereof, for example, though the scope of the example embodiments is not limited in this respect. Processor 906 is connected to a communication infrastructure 902, which may include, for example, a communication bus. In some embodiments, processor 906 can simultaneously operate multiple computing thread.

Computer 900 also includes a primary or main memory 908, such as a random access memory (RAM). Main memory has stored therein control logic 924 (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such as a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer usable or readable storage medium 918 having stored therein computer software 926 (control logic) and/or data. Removable storage unit 916 represents a floppy disk, magnetic tape, compact disc (CD), digital versatile disc (DVD), Blu-ray disc, optical storage disk, memory stick, memory card, or any other computer data storage device. Removable storage drive 914 reads from and/or writes to removable storage unit 916 in a well-known manner.

Computer 900 also includes input/output/display devices 904, such as monitors, keyboards, pointing devices, etc.

Computer 900 further includes a communication or network interface 920. Communication interface 920 enables computer 900 to communicate with remote devices. For example, communication interface 920 allows computer 900 to communicate over communication networks or mediums 922 (representing a form of a computer usable or readable medium), such as local area networks (LANs), wide area networks (WANs), the Internet, etc. Network interface 920 may interface with remote sites or networks via wired or wireless connections. Examples of communication interface 922 include but are not limited to a modem (e.g., for 3G and/or 4 G communication(s)), a network interface card (e.g., an Ethernet card for Wi-Fi and/or other protocols), a communication port, a Personal Computer Memory Card International Association (PCMCIA) card, a wired or wireless USB port, etc.

Control logic 928 may be transmitted to and from computer 900 via the communication medium 922.

Any apparatus or manufacture comprising a computer useable or readable medium having control logic (software) stored therein is referred to herein as a computer program product or program storage device. This includes, but is not limited to, computer 900, main memory 908, secondary storage devices 910, and removable storage unit 916. Such computer program products, having control logic stored therein that, when executed by one or more data processing devices, cause such data processing devices to operate as described herein, represent embodiments.

The disclosed technologies may be embodied in software, hardware, and/or firmware implementations other than those described herein. Any software, hardware, and firmware implementations suitable for performing the functions described herein can be used.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A communication device, comprising:
speaker identification logic configured to apply a speaker identification algorithm to a speech signal to generate speaker identification information, the speaker identification information including at least an identifier that identifies a target speaker associated with the speech signal; and
speech processing logic comprising a plurality of speech signal processing stages, wherein each of the plurality of speech signal processing stages is configured to process the speech signal in accordance with a respective speech processing algorithm based on the speaker identification information provided by the speaker identification logic,
wherein the speaker identification logic is further configured to apply the speaker identification algorithm to the speech signal to generate a first measure of confidence that is indicative of the likelihood that the speech signal is associated with a target speaker;
wherein a first speech signal processing stage of the plurality of speech signal processing stages is configured to process the speech signal in accordance with a first speech processing algorithm in a manner that takes into account the first measure of confidence to produce a processed speech signal; and wherein the speaker identification logic is further configured to apply the speaker identification algorithm to the processed speech signal to generate a second measure of confidence that is indicative of the likelihood that the processed speech signal is associated with the target speaker.

2. The communication device of claim 1, wherein a second speech signal processing stage of the plurality of speech signal processing stages is configured to process the processed speech signal in accordance with a second speech processing algorithm in a manner that takes into account the second measure of confidence.

3. The communication device of claim 1, wherein the speech signal is an uplink speech signal.

4. The communication device of claim 2, wherein the speech signal is a downlink speech signal.

5. The communication device of claim 3, wherein the speaker identification logic is configured to apply the speaker identification algorithm to the speech signal to generate the first measure of confidence by;
   obtaining a speaker model; and
   generating the first measure of confidence by comparing one or more features of at least a portion of the speech signal to one or more features of the speaker model.

6. The communication device of claim 5, wherein obtaining the speaker model comprises:
   obtaining the speaker model from a storage component of the communication device.

7. The communication device of claim 6, wherein obtaining the speaker model comprises:
   obtaining the speaker model based at least on analyzing a portion of the speech signal.

8. A method performed by a communication device, comprising:
   making a first speaker identification determination as to an identity of a target speaker based on a speech signal received by the communication device;
   processing the speech signal by a first speech processing stage that is configured to process the speech signal in accordance with a first speech processing algorithm based on the first speaker identification determination to produce a first processed speech signal; and
   making a second speaker identification determination as to the identity of the target speaker based on the first processed speech signal.

9. The method of claim 8, further comprising:
   processing the first processed speech signal by a second speech processing stage that is configured to process the first processed speech signal in accordance with a second speech processing algorithm based on the second speaker identification determination to produce a second processed speech signal.

10. The method of claim 9, wherein the speech signal is an uplink speech signal.

11. The method of claim 10, wherein the speech signal is a downlink speech signal.

12. The method of claim 11, wherein said making the first speaker identification determination comprises:
   obtaining a speaker model; and
   comparing one or more features of at least a portion of the speech signal to one or more features of the speaker model to determine a likelihood that the portion of the speech signal is associated with the target speaker.

13. The method of claim 12, wherein obtaining the speaker model comprises:
   obtaining the speaker model from a storage component of the communication device.

14. The method of claim 13, wherein obtaining the speaker model comprises:
   obtaining the speaker model based at least on analyzing a portion of the speech signal.

15. A communication device, comprising:
   speaker identification logic configured to make a first speaker identification determination as to an identity of a target speaker based on a speech signal received by the communication device; and
   a first speech processing stage configured to process the speech signal in accordance with a first speech processing algorithm based on the first speaker identification determination to produce a first processed speech signal, wherein
   the speaker identification logic is further configured to make a second speaker identification determination as to the identity of the target speaker based on the first processed speech signal.

16. The communication device of claim 15, further comprising a second speech processing stage that is configured to process the first processed speech signal in accordance with a second speech processing algorithm based on the second speaker identification determination to produce a second processed speech signal.

17. The communication device of claim 16, wherein the speech signal is an uplink speech signal.

18. The communication device of claim 17, wherein the speech signal is a downlink speech signal.

19. The communication device of claim 18, wherein the speaker identification logic is further configured to:
   obtain a speaker model; and
   compare one or more features of at least a portion of the speech signal to one or more features of the speaker model to determine a likelihood that the portion of the speech signal is associated with the target speaker.

20. The communication device of claim 19, wherein the speaker identification logic is configured to obtain the speaker model by:
   obtaining the speaker model from a storage component of the communication device.

* * * * *

UNITED STATES PATENT AND TRADEMARK OFFICE
CERTIFICATE OF CORRECTION

PATENT NO. : 9,293,140 B2  
APPLICATION NO. : 13/965661  
DATED : March 22, 2016  
INVENTOR(S) : Juin-Hwey Chen et al.

Page 1 of 1

It is certified that error appears in the above-identified patent and that said Letters Patent is hereby corrected as shown below:

In the Claims

In column 23, line 15, in claim 4, delete "claim 2," and insert -- claim 1, --, therefor.

In column 23, line 17, in claim 5, delete "claim 3," and insert -- claim 1, --, therefor.

In column 23, line 29, in claim 7, delete "claim 6," and insert -- claim 5, --, therefor.

In column 23, line 53, in claim 10, delete "claim 9," and insert -- claim 8, --, therefor.

In column 24, line 1, in claim 11, delete "claim 10," and insert -- claim 8, --, therefor.

In column 24, line 3, in claim 12, delete "claim 11," and insert -- claim 8, --, therefor.

In column 24, line 14, in claim 14, delete "claim 13," and insert -- claim 12, --, therefor.

In column 24, line 38, in claim 17, delete "claim 16," and insert -- claim 15, --, therefor.

In column 24, line 40, in claim 18, delete "claim 17," and insert -- claim 15, --, therefor.

In column 24, line 42, in claim 19, delete "claim 18," and insert -- claim 15, --, therefor.

Signed and Sealed this  
Sixteenth Day of August, 2016

Michelle K. Lee  
*Director of the United States Patent and Trademark Office*